United States Patent
Thorwirth

(10) Patent No.: US 11,611,808 B2
(45) Date of Patent: Mar. 21, 2023

(54) SYSTEMS AND METHODS OF PREPARING MULTIPLE VIDEO STREAMS FOR ASSEMBLY WITH DIGITAL WATERMARKING

(71) Applicant: Verimatrix, Inc., San Diego, CA (US)

(72) Inventor: Niels J. Thorwirth, San Diego, CA (US)

(73) Assignee: Verimatrix, Inc., San Diego, CA (US)

( * ) Notice: Subject to any disclaimer, the term of this patent is extended or adjusted under 35 U.S.C. 154(b) by 476 days.

(21) Appl. No.: 16/611,822

(22) PCT Filed: May 9, 2018

(86) PCT No.: PCT/US2018/031912
§ 371 (c)(1),
(2) Date: Nov. 7, 2019

(87) PCT Pub. No.: WO2018/208997
PCT Pub. Date: Nov. 15, 2018

(65) Prior Publication Data
US 2020/0186894 A1    Jun. 11, 2020

Related U.S. Application Data

(60) Provisional application No. 62/503,833, filed on May 9, 2017.

(51) Int. Cl.
*G06K 9/00*     (2022.01)
*H04N 21/8358*  (2011.01)
(Continued)

(52) U.S. Cl.
CPC ......... *H04N 21/8358* (2013.01); *G06F 21/16* (2013.01); *G06Q 20/127* (2013.01);
(Continued)

(58) Field of Classification Search
CPC ... G06T 1/0071; G06T 1/0021; G06T 1/0028; G06T 2201/0053; G06T 1/0092;
(Continued)

(56) References Cited

U.S. PATENT DOCUMENTS 5,805,700 A   9/1998   Nardone et al.
5,832,119 A   11/1998  Rhoads
(Continued)

FOREIGN PATENT DOCUMENTS

EP   0897245 A2   2/1999
EP   1595257 A1   11/2005
(Continued)

OTHER PUBLICATIONS

International Preliminary Report on Patentability for International Application PCT/US2018/031912, Report Issued Nov. 12, 2019, dated Nov. 21, 2019, 6 Pgs.
(Continued)

*Primary Examiner* — Avinash Yentrapati
(74) *Attorney, Agent, or Firm* — KPPB LLP

(57) ABSTRACT

Systems and methods for encoding multiple video streams with digital watermarking for adaptive bitrate streaming in accordance with embodiments of the invention are disclosed. In one embodiment, a method for preprocessing multimedia content into streams with watermark information includes receiving a source content media stream, generating at least two variant preprocessed streams for each received source content media stream, where each variant preprocessed stream includes different watermark information in the same locations as the other variant preprocessed streams and where marked locations are spaced apart at least a distance equal to a predetermined maximum segment size, generating a set of embed location information describing marked locations in the variant preprocessed streams, gen-
(Continued)

erating at least one variant output stream from each variant preprocessed stream using video compression, partitioning each variant output stream into a set of segments, where each segment is no longer than the predetermined maximum segment size and contains at most one copy of the watermark information, generating a set of segment boundary information describing the boundaries of segments within the variant output streams and the boundaries are the same between variant output streams, and generating a segment selection list using the set of embed location information and the set of segment boundary information, where the segment selection list includes only one variant segment for each segment according to a watermark sequence and the digits of the watermark sequence correspond to the watermark information applied to each variant preprocessed stream.

8 Claims, 7 Drawing Sheets

(51) Int. Cl.
  G06F 21/16  (2013.01)
  G06Q 20/12  (2012.01)
  G06T 1/00  (2006.01)
  H04N 21/2343  (2011.01)
  H04N 21/2389  (2011.01)
(52) U.S. Cl.
  CPC ....... *G06Q 20/1235* (2013.01); *G06T 1/0071* (2013.01); *H04N 21/23439* (2013.01); *H04N 21/23892* (2013.01); *G06F 2221/0733* (2013.01)
(58) Field of Classification Search
  CPC ............. G06F 21/10; H04N 21/23439; H04N 21/23892; H04N 21/8358
  USPC ........................................................ 382/100
  See application file for complete search history.

(56) References Cited

U.S. PATENT DOCUMENTS

| | | | |
|---|---|---|---|
| 5,946,414 | A | 8/1999 | Cass et al. |
| 6,141,753 | A | 10/2000 | Zhao et al. |
| 6,285,774 | B1 | 9/2001 | Schumann et al. |
| 6,359,998 | B1 | 3/2002 | Cooklev |
| 6,415,031 | B1 | 7/2002 | Colligan et al. |
| 6,674,876 | B1 | 1/2004 | Hannigan et al. |
| 6,757,407 | B2 | 6/2004 | Bruckstein et al. |
| 6,785,401 | B2 | 8/2004 | Walker et al. |
| 6,912,010 | B2 | 6/2005 | Baker et al. |
| 6,999,598 | B2 | 2/2006 | Foote et al. |
| 7,065,212 | B1 | 6/2006 | Yu et al. |
| 7,085,398 | B2 | 8/2006 | Baudry et al. |
| 7,266,466 | B2 | 9/2007 | Lemma et al. |
| 7,346,163 | B2 | 3/2008 | Pedlow, Jr. et al. |
| 7,386,148 | B2 | 6/2008 | Seroussi |
| 7,555,650 | B1 | 6/2009 | Zhao et al. |
| 7,664,332 | B2 * | 2/2010 | Wong ...................... G06F 21/10 382/232 |
| 7,925,774 | B2 | 4/2011 | Zhang et al. |
| 8,515,123 | B2 | 8/2013 | Thorwirth |
| 8,995,711 | B2 | 3/2015 | Thorwirth |
| 9,532,113 | B2 | 12/2016 | Thorwirth |
| 10,045,093 | B2 | 8/2018 | Thorwirth |
| 2001/0051996 | A1 | 12/2001 | Cooper et al. |
| 2002/0150239 | A1 | 10/2002 | Carny et al. |
| 2003/0140257 | A1 | 7/2003 | Peterka et al. |
| 2003/0145329 | A1 | 7/2003 | Candelore |
| 2003/0149879 | A1 | 8/2003 | Tian et al. |
| 2003/0174837 | A1 | 9/2003 | Candelore et al. |
| 2003/0187679 | A1 | 10/2003 | Odgers et al. |
| 2003/0188154 | A1 | 10/2003 | Dallard et al. |
| 2003/0190054 | A1 | 10/2003 | Troyansky et al. |
| 2003/0228018 | A1 | 12/2003 | Vince |
| 2004/0010717 | A1 | 1/2004 | Simec et al. |
| 2004/0028227 | A1 | 2/2004 | Yu |
| 2004/0057581 | A1 | 3/2004 | Rhoads |
| 2004/0081333 | A1 | 4/2004 | Grab et al. |
| 2004/0091109 | A1 | 5/2004 | Son et al. |
| 2004/0117427 | A1 | 6/2004 | Allen et al. |
| 2004/0125952 | A1 | 7/2004 | Alattar et al. |
| 2004/0139047 | A1 | 7/2004 | Rechsteiner et al. |
| 2004/0260930 | A1 | 12/2004 | Malik et al. |
| 2005/0204168 | A1 | 9/2005 | Johnston et al. |
| 2006/0005029 | A1 * | 1/2006 | Petrovic ................ G06T 1/0021 713/176 |
| 2006/0101269 | A1 | 5/2006 | Moskowitz et al. |
| 2007/0052727 | A1 | 3/2007 | Rhoads |
| 2007/0053513 | A1 | 3/2007 | Hoffberg |
| 2007/0242862 | A1 | 10/2007 | Watson et al. |
| 2007/0283448 | A1 | 12/2007 | Green |
| 2007/0291979 | A1 | 12/2007 | Thorwirth |
| 2009/0041237 | A1 | 2/2009 | Takashima et al. |
| 2009/0080689 | A1 | 3/2009 | Zhao et al. |
| 2009/0136087 | A1 | 5/2009 | Oren et al. |
| 2009/0158318 | A1 | 6/2009 | Levy |
| 2010/0027684 | A1 | 2/2010 | Zou et al. |
| 2010/0158101 | A1 | 6/2010 | Wu et al. |
| 2011/0129116 | A1 | 6/2011 | Thorwirth |
| 2012/0045054 | A1 | 2/2012 | Main et al. |
| 2013/0054972 | A1 | 2/2013 | Thorwirth |
| 2013/0142382 | A1 * | 6/2013 | Petrovic ................... G06F 21/10 382/100 |
| 2013/0227293 | A1 * | 8/2013 | Leddy ................ H04N 1/32304 713/176 |
| 2014/0270337 | A1 | 9/2014 | Zhao et al. |
| 2016/0156994 | A1 * | 6/2016 | Celik ............. H04N 21/234345 725/32 |
| 2017/0208372 | A1 | 7/2017 | Thorwirth |

FOREIGN PATENT DOCUMENTS

| | | |
|---|---|---|
| EP | 1764780 A1 | 3/2007 |
| EP | 3333741 A1 | 6/2018 |
| EP | 3333741 B1 | 7/2019 |
| EP | 3622426 A1 | 3/2020 |
| EP | 3647974 A1 | 5/2020 |
| WO | 2004114208 A2 | 12/2004 |
| WO | 2007067168 A1 | 6/2007 |
| WO | 2007072442 A2 | 6/2007 |
| WO | 2007108795 A1 | 9/2007 |
| WO | 2011103364 A1 | 8/2011 |
| WO | 2018208997 A1 | 11/2018 |

OTHER PUBLICATIONS

International Search Report and Written Opinion for International Application No. PCT/US2018/031912, Search completed Jul. 3, 2018, dated Jul. 23, 2018, 11 Pgs.
"Group of pictures", Wikipedia, last edited on Dec. 28, 2016, 2 pages.
"Ultra HD Forum: Phase A Guidelines", Ultra HD Forum, Revision 1.3, Apr. 24, 2017, Fremont, CA, 84 pages.
Extended European Search Report for European Application No. 18798120.4, Search completed Dec. 7, 2020, dated Dec. 15, 2020 11 pgs.
H. Liu et al., "Real Time Digital Video Watermarking For Digital Rights Management Via Modification of VLC", Parallel and Distributed Systems, 2005. Proceedings. 11th International Conference on Jul. 22, 2005, vol. 2, pp. 295-299.
European Supplementary Search Report for Application No. EP 09774601, Search Completed Nov. 8, 2011, 6 pgs.
Extended European Search Report for European Application No. 17197753.1, Search completed Mar. 21, 2018, dated Apr. 3, 2018, 6 Pgs.
Extended European Search Report for European Application No. 19188582.1, Search completed Mar. 30, 2020, dated Apr. 8, 2020, 11 Pgs.

(56) References Cited

OTHER PUBLICATIONS

International Preliminary Report on Patentability for International Application No. PCT/US2005/043895, dated Jun. 11, 2008, 9 pgs.
International Preliminary Report on Patentability for International Application No. PCT/US2011/025341, dated Aug. 21, 2012, 7 Pgs.
International Search Report for International Application No. PCT/US2009/049718, date completed Aug. 10, 2009, dated Aug. 25, 2009, 4 pgs.
International Search Report for International Application No. PCT/US2011/025341, Search Completed Apr. 8, 2011, dated Apr. 19, 2011, 2 pgs.
Supplementary European Search Report for Application No. EP 11745281, International Filing Date Feb. 17, 2011, Search Completed Sep. 30, 2013, 8 pgs.
Written Opinion of the International Searching Authority for International Application No. PCT/US2009/049718, date completed Aug. 11, 2009, dated Aug. 25, 2009, 9 pgs.
A. Jin et al., "Resynchronization and Remultiplexing for Transcoding to H.264/AVC", Univ. Science A, 2006, vol. 7, Suppl. I, pp. 76-81.
Aweke Lemma et al, "Secure Watermark Embedding through Partial Encryption", Y.Q. Shi and B. Jeon (Eds.): IWDW2006, LNCS 4283, 2006, pp. 433-445.
B. Mobasseri et al., "Watermarking MPEG-2 Video in Compressed Domain Using VLC Mapping", ACM Multimedia and Security Workshop, Aug. 2, 2005, 4 pgs.
Cox et al., "Digital Watermarking and Steganography", Second Edition, The Morgan Kaufmann Series in Multimedia Information and Systems, Nov. 27, 2007, 587 pgs.
Dolan, Michael et al., "Sample variants, signatures and other improvements for the ISOBMFF", International Organisation for Standardisation, MPEG-4 Systems, ISO/IEC JTC1/SC29/WG11 MPEG2014/N14326, Apr. 2014, Valencia, Spain, Retrieved from http://mpeg.chiariglione.org/standards/mpeg-4/iso-base-media-file-format/tuc-sample-variants-signatures-and-other-improvements, 19 pgs.
F.Y. Duan et al., "A Short Summary of Digital Watermarking Techniques for Multimeda Data", pp. 1-10.
Fecheyr-Lippens, "A Review of HTTP Live Streaming", XP002638990, Retrieved from the Internet: URL:http://issuu.comjandrubyjdocsjhttp live streaming, Jan. 25, 2010, pp. 1-38.
I. Cox et al., "Facilitating Watermark Insertion by Preprocessing Media", EURASIP Journal on Applied Signal Processing, 2004, vol. 14, pp. 2081-2092.
J. Foote et al., "Time Base Modulation: A New Approach to Watermarking Audio", 2003 International Conference on Multimedia and Expo. ICME '03. Proceedings (Cat. No.03TH8698), Jul. 6-9, 2003, Baltimore, MD, US, pp. 1-4, DOI: 10.1109/ICME.2003.1220894.
Jarnikov, Dmitri et al., "A Watermarking System for Adaptive Streaming", White Paper, Irdeto, the Netherlands, Feb. 28, 2014, 12 pgs.
K. Sonoda et al., "Blind Detection of Watermarks Embedded by Periodical Phase Shifts", Acoust. Sci. &Tech. vol. 25, No. 1, 2004, pp. 103-105.
M. Celik et al., "Collusion-Resilient Fingerprinting by Random Pre-Warping", Signal Processing Letters, IEEE, Oct. 2004, vol. 11, No. 10, pp. 831-835.
Pantos et al., "HTTP Live Streaming, draft-pantos-http-live-streaming-02.txt", Oct. 5, 2009, 20 pgs.
Profrock et al., "H.264/AVC video authentication using skipped macroblocks for an erasable watermark", Visual Communications and Image Processing, Jul. 12, 2005, 10 pgs.
Sniffen, "Practically engageable adversaries for streaming media", Springer, Internet Citation, XP002696092, 2009, pp. 1-9.
Y. Mao et al., "Collusion-Resistant Intentional De-Synchronization For Digital Video Fingerprinting", Image Processing, 2005. ICIP 2005. IEEE International Conference, Sep. 11-14, 2005, vol. 1, pp. 237-240.
Z. Liu et al., "Direct Fingerprinting on Multicasting Compressed Video", 11th International Multimedia Modelling Conference, 2005, pp. 76-83.
Zou et al., "H.264/AVC Stream Replacement Technique For Video Watermarking", Acoustics, Speech and Signal Processing, 2008, ICASSP 2008, IEEE International Conference on Mar. 31, 2008, pp. 1749-1752.

* cited by examiner

SYSTEMS AND METHODS OF PREPARING MULTIPLE VIDEO STREAMS FOR ASSEMBLY WITH DIGITAL WATERMARKING

CROSS REFERENCE TO RELATED APPLICATIONS

This application is a national stage of PCT Patent Application No. PCT/US2018/031912, entitled "Systems and Methods of Preparing Multiple Video Streams for Assembly with Digital Watermarking" to Thorwirth, filed May 9, 2018, which claims priority under 35 U.S.C. § 119(e) to U.S. Provisional Patent Application No. 62/503,833, entitled "Universal Creation and Selection Process of Adaptive Bitrate Segments to Enable Digital Watermarking", to Thorwirth filed May 9, 2017, the disclosures of which are incorporated by reference herein in their entirety.

FIELD OF THE INVENTION

The present invention generally relates to video encoding and more specifically to systems and methods for efficiently encoding multiple streams of video content with digital watermarking for adaptive bitrate streaming from a source video stream.

BACKGROUND OF THE INVENTION

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bitrate streaming (ABR), or adaptive streaming, involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources. When a playback device commences adaptive bitrate streaming, the playback device typically starts by requesting portions of media from the lowest bitrate streams (where alternative streams are available). As the playback device downloads the requested media, the playback device can measure the available bandwidth. In the event that there is additional bandwidth available, the playback device can switch to higher bitrate streams.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. Commonly used media container formats include Matroska, the MP4 container format specified in MPEG-4 Part 14 (i.e. ISO/IEC 14496-14), and the MPEG transport stream (TS) container specified in MPEG-2 Part 1 (i.e. ISO/IEC Standard 13818-1). The MP4 container format is utilized in ABR systems such as DASH including as specified by ISO in ISO/IEC 23009-1 Information technology—Dynamic adaptive streaming over HTTP (DASH)—Part Media presentation description and Segment formats, IIS Smooth Streaming and Flash Dynamic Streaming. The TS container is used in HTTP Adaptive Bitrate Streaming. The video in the alternate streams can be encoded pursuant to a variety of block-oriented video compression standards (or codecs) such as High Efficiency Video Coding (HEVC/H.265) specified jointly by the ISO/IEC Moving Picture Experts Group (MPEG) and the International Telecommunication Union Telecommunication Standardization Sector (ITU-T) of Geneva, Switzerland and H.264/MPEG-4 AVC (Advanced Video Coding) standard specified by the ITU-T.

SUMMARY OF THE INVENTION

Systems and methods for encoding multiple video streams with digital watermarking for adaptive bitrate streaming in accordance with embodiments of the invention are disclosed. In one embodiment, a method for preprocessing multimedia content into streams with watermark information includes receiving a source content media stream, generating at least two variant preprocessed streams for each received source content media stream, where each variant preprocessed stream includes different watermark information in the same locations as the other variant preprocessed streams and where marked locations are spaced apart at least a distance equal to a predetermined maximum segment size, generating a set of embed location information describing marked locations in the variant preprocessed streams, generating at least one variant output stream from each variant preprocessed stream using video compression, partitioning each variant output stream into a set of segments, where each segment is no longer than the predetermined maximum segment size and contains at most one copy of the watermark information, generating a set of segment boundary information describing the boundaries of segments within the variant output streams and the boundaries are the same between variant output streams, and generating a segment selection list using the set of embed location information and the set of segment boundary information, where the segment selection list includes only one variant segment for each segment according to a watermark sequence and the digits of the watermark sequence correspond to the watermark information applied to each variant preprocessed stream.

Another embodiment includes generating a playlist from the segment selection list, where the playlist includes information enabling a playback device to retrieve watermarked content.

A further embodiment includes generating a media file from the segment selection list, where the media file includes content segments marked in a manner corresponding to the watermark sequence of the segment selection list.

Another yet embodiment includes generating at least one variant output stream from each variant preprocessed stream using video compression includes generating a set of variant alternative streams from each variant preprocessed stream, where the variant alternative streams in each set differ in bitrate and the available bitrates in each set is the same.

In another embodiment, generating at least one variant output stream from each variant preprocessed stream using video compression includes encoding only once segments that are not marked.

In still another embodiment, the watermark sequence is a binary representation of the different ways that the selected segments are marked.

In yet another embodiment, the watermark sequence is generated from a subscriber identifier associated with a user, an asset identifier associated with a piece of content, and a transaction identifier associated with a purchase transaction.

DETAILED DISCLOSURE OF THE INVENTION

Figure 1:
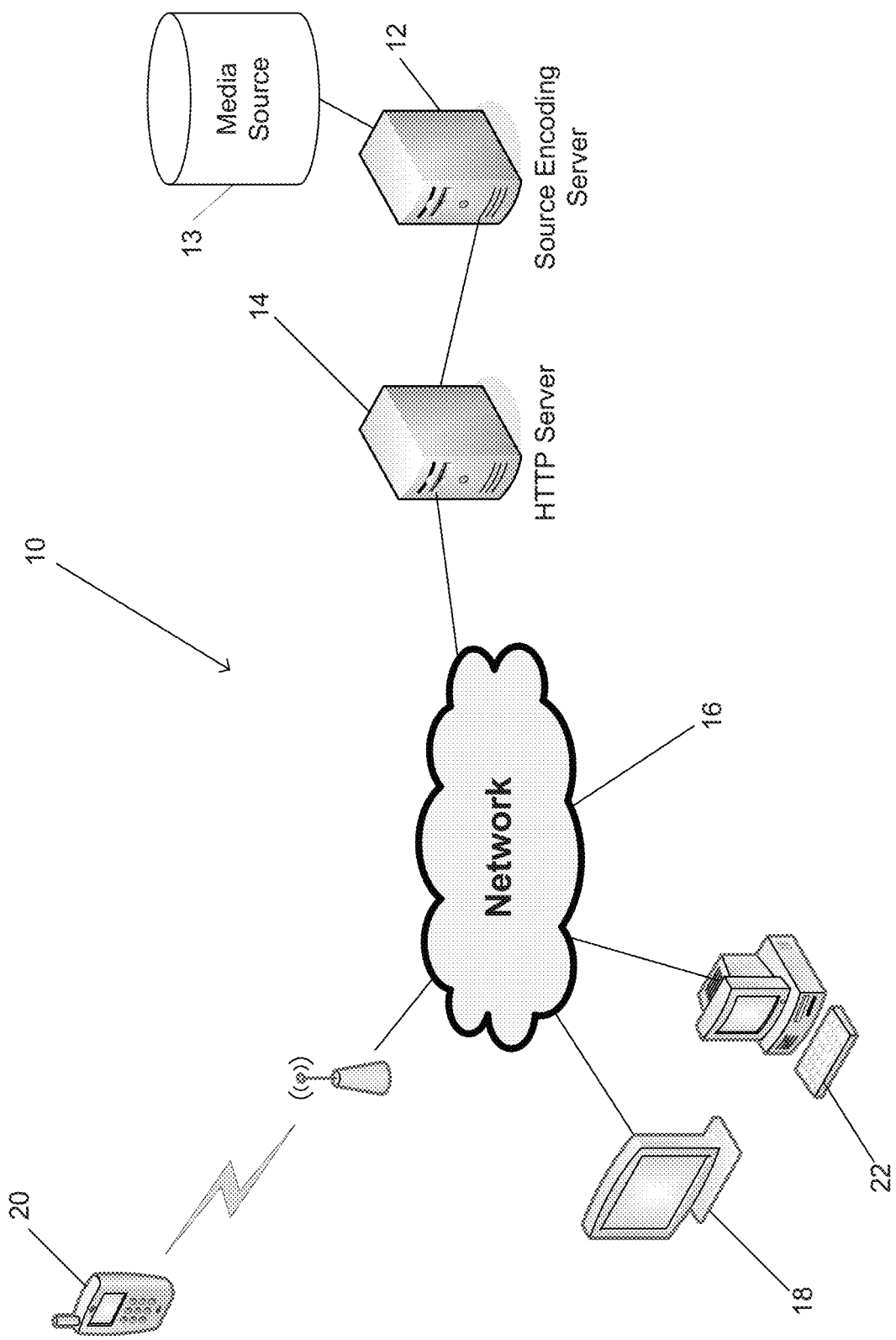
FIG. 1 is a system diagram of an adaptive streaming system in accordance with embodiments of the invention.

Turning now to the drawings, systems and methods for encoding multiple video streams with digital watermarking for adaptive bitrate streaming in accordance with embodiments of the invention are illustrated. The present application describes several embodiments of a system that allows the preparation of content for individualized delivery. One common format of delivery is the segmentation of content into content segments or chunks in different bitrates, that allow the client to choose a bitrate that can playback without interruption given current conditions, e.g., bandwidth (also called adaptive bitrate streaming or ABR). The segments can be prepared in copies of different variations as explained in U.S. Patent Publication No. 2013/0054972, the portions of which relevant to preparing media streams is incorporated by reference in its entirety. The sequence of how segments are marked with different watermarks can be used as a unique identifying watermark sequence, as discussed in U.S. Patent Publication No. 2011/0129116, the portions of which relevant to watermark sequences is incorporated by reference in its entirety. To create the segments the encoder may be aware of the locations that contain variations and create alternative segments during encode. This approach however may require a modification of the encoder. A simpler approach is to create different content streams, containing different variations, typically at the same locations. The encoder can take the variations and encode the streams as independent streams, without needing to be aware of the marked locations or any other information about the embedding approach.

A segmenter can partition the content into different segments to enable bitrate switching by a client device. Traditionally this is done for each bitrate at the same locations to enable seamless switching between segments of different bitrates. This same process can also be applied to all marked streams (typically 2) in all bitrates. This can also occur independent of the knowledge of the embedding location and the variations in the stream and will result in segments that each contain at most one variation if, during the preparation of the content, the locations have been spread apart with a distance larger than the maximum segment size that the segmenter will create. In this process some segments will not have a mark in some embodiments. Comparing the locations (e.g. frame numbers) of marked frames with the segments they are in (after ABR segmentation) the marks can be selected:

To now enable the selection of segments in a way to enable a unique and predetermined sequence of segments that represents a bitstring unique to a client, user or transaction, a Payload Encode module can be configured to read a list of the embedding locations (encoded as frame number or frame display time) and compare it to a list of the segment start and duration to derive the segments that contain varying segments and vary in order to set bits. The list defining the segments may be a standard defined list such as .m3u8—used for Apple HLS
.mpd—manifest used for MPEG DASH streaming format
SMIL—Synchronized Multimedia Integration Language
VAST—Video Ad Serving Template:
VPAID—Video Player Ad Interface Definition:
VMAP—Video Multi-Ad Playlist
or other formats, including non-standard.

The comparison process may also be used to identify the segments that are not used for embedding (i.e., corresponding segments across streams are not marked in any of the streams) and one of the copies can be removed for them since they do not vary between different tracks/embedded versions. This can reduce the amount of required storage on content servers hosting content files which may be with a CDN (content delivery network).

In adaptive streaming systems, multimedia content is encoded as a set of alternative streams of video data. Typically each alternative stream of video data is encoded using the same source multimedia content. Adaptive streaming systems are typically configured allow for streaming of multimedia content encoded at different bitrates and resolutions over a network, such as the Internet. An aim of adaptive streaming systems is to stream the highest quality version of a piece of multimedia content that can be supported based upon current streaming conditions at that particular time. Multimedia content can include video and audio data, subtitles, and/or other related metadata. In order to provide the highest quality video experience independent of the network data rate, adaptive streaming systems are configured to switch between the available sources of video data throughout the delivery of the video data according to a variety of factors, including, but not limited to, the available network data rate and video decoder performance. When streaming conditions deteriorate, an adaptive streaming system typically attempts to switch to multimedia streams encoded at lower bitrates. In the event that the available network data rate cannot support streaming of the stream encoded at the lowest bitrate, then playback is often disrupted until a sufficient amount of content can be buffered to restart playback.

To create the multiple sources of video data utilized in adaptive streaming systems, a source encoder can be configured to encode a plurality of alternative streams of video data from a source video contained in a piece of multimedia content. In accordance with several embodiments of the invention, a source encoder may be implemented using a media source and/or a media server. In accordance with some embodiments of the invention, a set of alternative streams of video data based on the same source video may contain video data at the same resolution but differing bitrates.

Adaptive Streaming System Architecture

Adaptive streaming systems in accordance with certain embodiments of the invention are configured to generate multiple streams of video that can be made available for streaming to user devices. In many embodiments of the invention, an adaptive streaming system includes a source encoding server that performs the encoding of multiple streams of video from source media. In several embodiments, the encoding includes preprocessing an input stream to embed watermark information into different variants of the content and then video compression of the different preprocessed streams into different bitrates to create ABR playback streams. An adaptive streaming system in accordance with embodiments of the invention is illustrated in FIG. 1. The illustrated adaptive streaming system 10 includes a source encoding server 12 configured to encode source media as a number of alternative streams. The source media may be stored on the encoding server 12 or retrieved from a media source 13. As will be discussed further below, the source encoding server 12 can generate container files containing the encoded streams, at least a plurality of which are alternative streams of encoded video. In some embodiments, the encoding server makes a first pass to make certain determinations about the characteristics of the source stream and/or output stream and a second pass to encode the content into multiple output streams, where the streams can have various resolutions and/or bitrates. In some embodiments, the first pass is completed before the second pass begins. In other embodiments, the second pass can commence before the first pass is completed. In other words, computational processes for the first and second passes can run simultaneously where frames are processed by the first pass process(es) before being processed by the second pass process(es). In some embodiments, files containing output streams are uploaded to a content server 14, which can be an HTTP server or CDN. A variety of playback devices 18, 20, and 22 can then request portions of the encoded streams from the content server 14 via a network 16 such as the Internet.

Although a specific adaptive streaming system for delivering media content streams is discussed above with respect to FIG. 1, any of a variety of streaming systems can be utilized to deliver media content streams in accordance with embodiments of the invention.

Source Encoders

Figure 2:
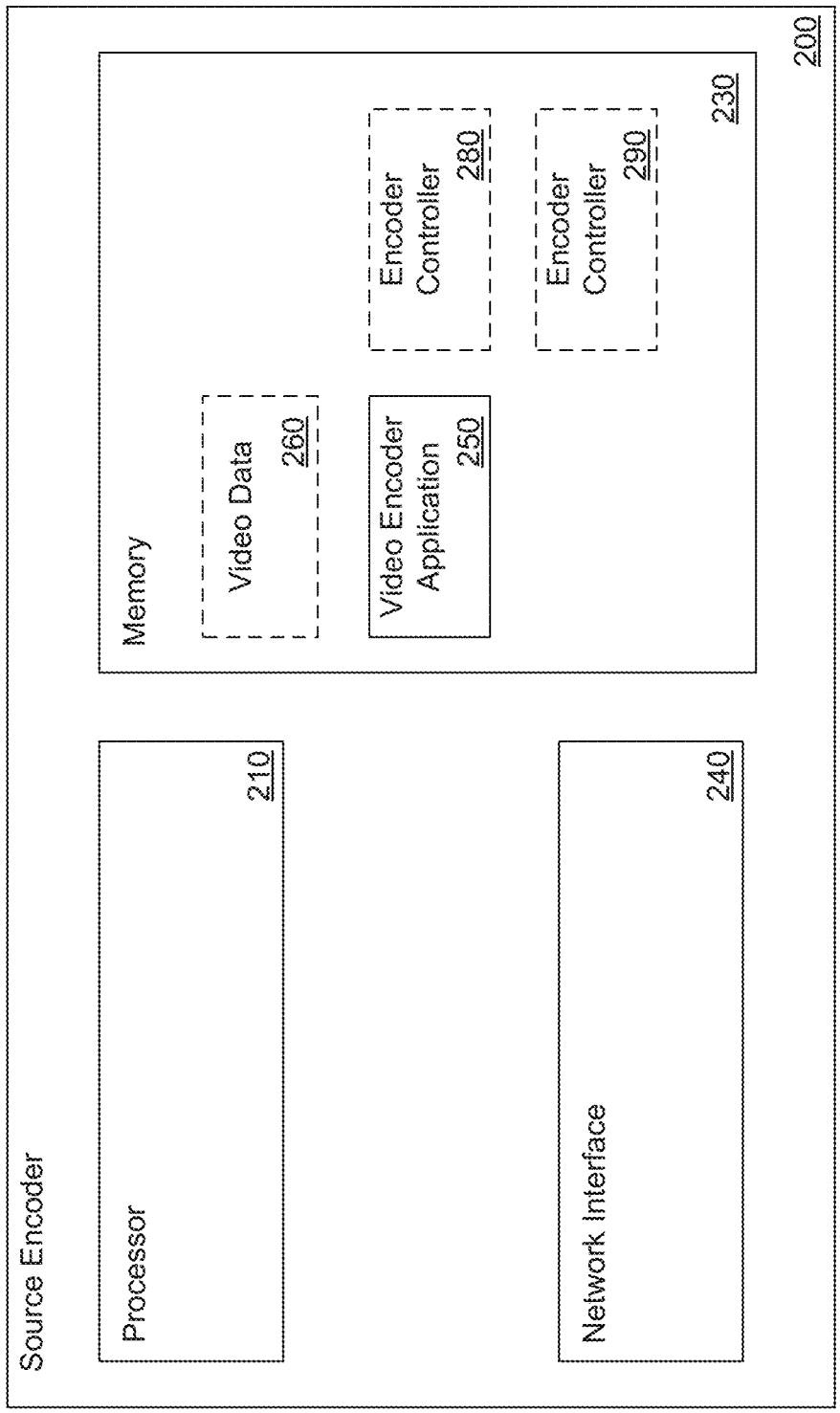
FIG. 2 conceptually illustrates a media server configured to encode streams of video data for use in adaptive streaming systems in accordance with embodiments of the invention.

In the illustrated embodiment, the adaptive bitrate streaming system includes one or more source encoders capable of encoding a source streaming of video content into alternative streams of encoded video having different resolutions and/or bitrates. In many embodiments, the source encoder can be implemented using any device capable of encoding streams of multimedia, where the streams are encoded at different resolutions, sampling rates, and/or maximum bitrates. The basic architecture of an adaptive streaming system source encoder in accordance with an embodiment of the invention is illustrated in FIG. 2. The source encoder 200 includes a processor 210 in communication with memory 230 and network interface 240. In the illustrated embodiment, the volatile memory 230 includes a source encoding application 250. The processor is configured by the source encoding application 250 to encode a plurality of streams of video data from source video data 260, which is also in volatile memory. The source video data 260 may already be present in memory or may be received via the network interface 240.

In a number of embodiments, the source encoder includes multiple processors and the encoding process can be distributed among the multiple processors. In many embodiments, the source encoding application 250 can launch multiple processes that execute on one or more processors where each process is an encoder controller 280 and 290 that encodes one or more output streams. In further embodiments, each encoder controller encodes multiple output streams at the same resolution and at different bitrates. In several embodiments, an encoder controller for each of three output resolutions is launched to be executed on one or more processors.

Although a specific architecture for a source encoder is illustrated in FIG. 2, any of a variety of architectures including architectures where the video encoder 250 is located on disk or some other form of storage and is loaded into memory 230 at runtime can be utilized to encode multimedia content in accordance with embodiments of the invention. Systems and methods for encoding of alternative streams of video data in accordance with embodiments of the invention are discussed further below.

Encoder Preprocessing Components

Figure 3:
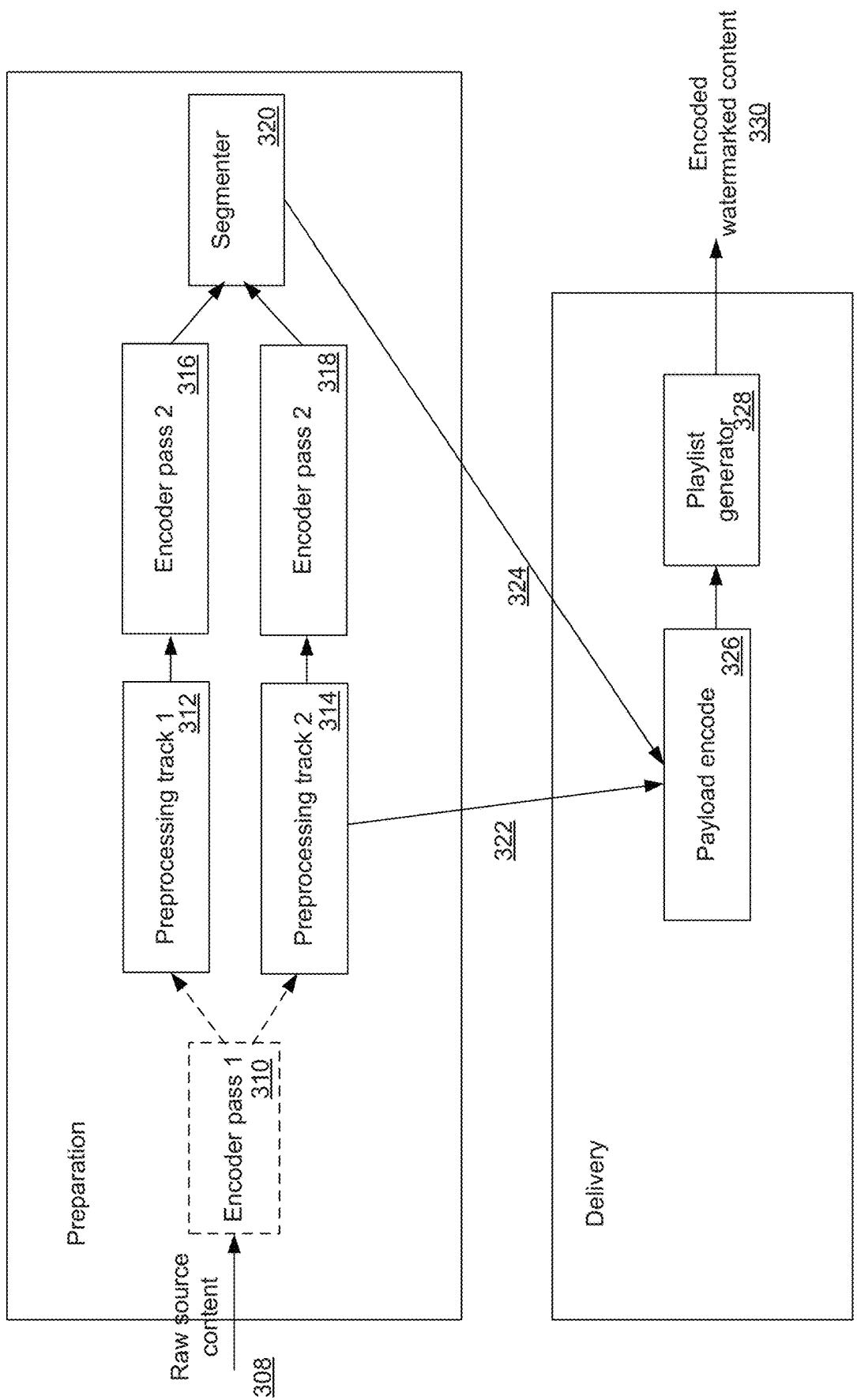
FIG. 3 conceptually illustrates components of an encoding process in accordance with embodiments of the invention.

Components of encoding processes that may be utilized in accordance with several embodiments of the invention are illustrated in FIG. 3. These components may be implemented in software or hardware as appropriate to a particular implementation.

Raw source content 308 is received and preprocessed by introducing watermark information to generate preprocessed streams 312 and 314. Each variant of the preprocessed streams 312 and 314 differ in that each is marked in a particular way (e.g., with a particular watermark) such that each way of watermarking can be representative of a "state." In several embodiments, this provides a binary representation (e.g., 0 or 1, A or B). Watermarks can be visible or invisible embedded information in a particular frame or across frames, as may be appropriate to any particular application. Watermark information may be inserted in certain locations that are the same in each stream. In many embodiments of the invention, preprocessing utilizes a maximum segment size so that locations that are marked in the content are spaced apart such that, when the content is segmented, each segment has at most one piece of watermark information. If a particular segment is marked, it is representative of that state (e.g., 0 or 1, A or B). The set of locations that are marked 322 are provided to payload encoder 326.

Watermarked encoded streams 316 and 318 are created by applying video compression to each variant of the preprocessed streams 312 and 314. This can include converting from frequency domain to a video format representation and associated actions such as determining frame format (I frame, P frame, B, frame), macroblock data, and/or motion vectors. In this way, there is a variant of a watermarked encoded stream for each variant of preprocessed stream.

A segmenter 320 partitions the encoded streams into segments each being no larger than the maximum segment size. The locations of segment boundaries 324 are provided to payload encoder 326. In some embodiments, a single output stream is generated from each preprocessed stream 312 and 314. In other embodiments, sets of two or more alternative streams are generated from each preprocessed stream 312 and 314. Each set of alternative streams includes the same perceptual content and the watermark information applied to the corresponding source preprocessed stream and the alternative streams within each set are encoded at different bitrates. In this way, the sets of encoded streams may be used to provide adaptive bitrate streaming of the content to a playback device.

Payload encoder generates a list of selected segments representative of a watermark sequence. The list is generated based on a particular watermark sequence. In some embodiments, a watermark sequence can be represented in binary format (e.g., 010011) and the segments are selected based on each digit in the watermark sequence and/or whether the segment is not marked. For example in one embodiment, with a watermark sequence of 010011, the segment are marked with watermark information corresponding to a zero state, a one state, a zero state, a zero state, a one state, and a one state. In some embodiments, the segment list can be used to create a media file containing the segments. In other embodiments, the segment list can be used to create a playlist that lists information which a playback device can use to retrieve the segments of content data (e.g., addresses and/or byte ranges).

Encoding Content with Digital Watermarking for Adaptive Bitrate Streaming

Figure 4:
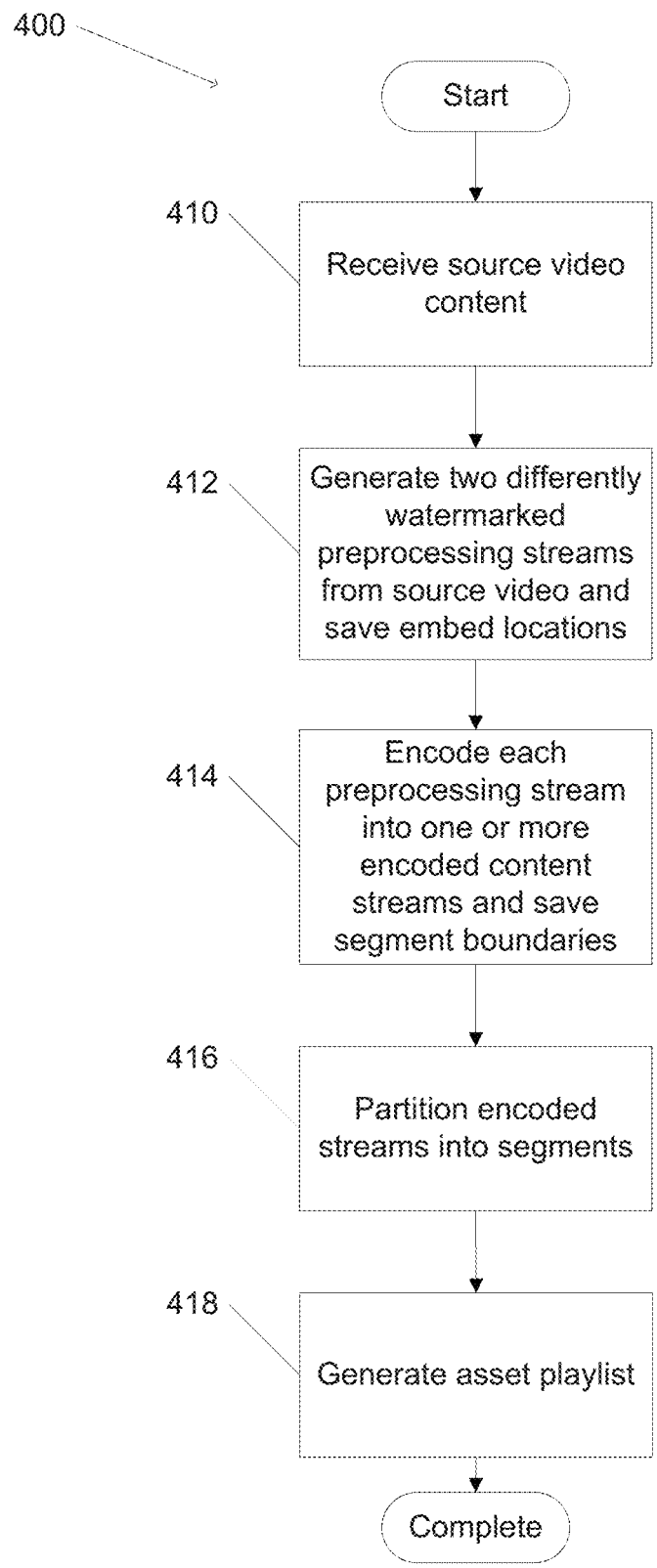
FIG. 4 is a flow chart illustrating a process for encoding streams of video in accordance with embodiments of the invention.
Figure 6:
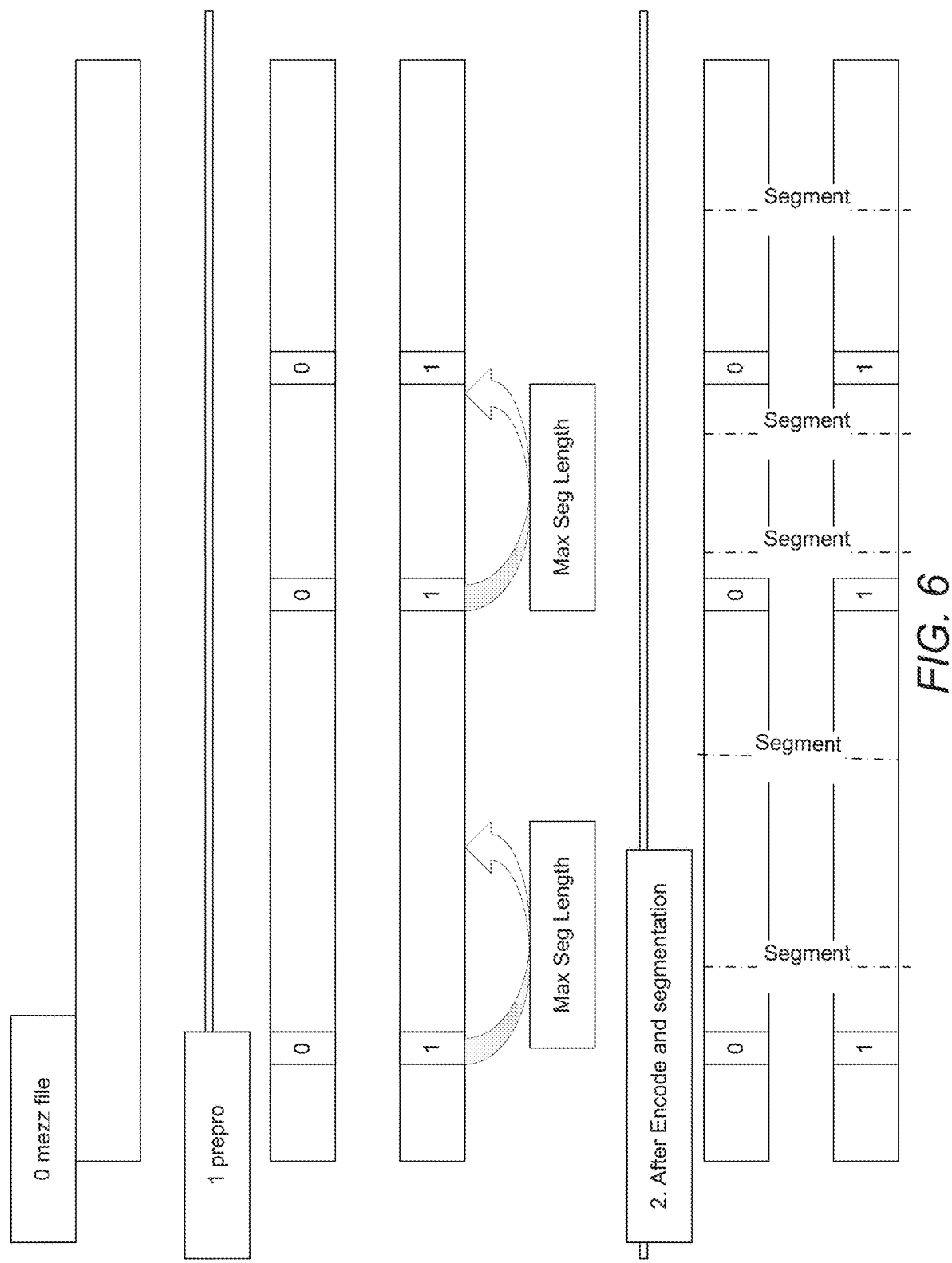
FIG. 6 conceptually illustrates examples of content during various stages of encoding in accordance with embodiments of the invention.

A process for encoding content including watermark information in accordance with an embodiment of the invention is illustrated in FIG. 4. The encoding process 300 includes receiving media content (410). An example of a mezzanine source file in accordance with several embodiments of the invention is conceptually illustrated in FIG. 6. The content can be contained in a single input file (e.g., a multimedia file or container format file), which can be referred to as a mezzanine file, or collection of media files. The content may also be an input stream of video received by the encoder. In several embodiments of the invention, the encoding process is implemented on an encoding server as an encoding application.

In some embodiments of the invention, the encoding process includes making a first pass in processing the source media stream (412). A first pass is often intended to make an initial analysis of the content in the source input video stream. For example, it can determine the correct allocation of bits for video streams that require variable amount of bits per frame to maintain quality, also known as variable bitrate or constant quality encoding. The first pass may determine the frame type for each frame (e.g., intra, predictive, bidirectional predictive) and other parameters used in encoding output streams from the source stream. In particular IDR (Instantaneous Decoder Refresh) information can be used to estimate the location of segment boundaries, since segmentation may only happen before IDR frames. Segment boundaries are important since one information unit such as a bit typically needs to be encoded within one segment, but may cover one or more frames. Other input allows for other optimizations such as estimating perceptual properties of the content. The IDR frame information may be produced by encoder output from a first pass encode.

The process includes generating at least two variants of preprocessed streams from the source video content and watermark information. Each variant has a variation of watermark information applied to it and may be referred to as a preprocessed stream. In many embodiments of the invention, the watermark information is embedded in locations within the content, where consecutive marked locations are spaced apart at least a distance equal to a predetermined maximum segment size, which is used to limit segment sizes when encoding the content as will be discussed further below. In several embodiments, the end of a marked portion of content is at least a length greater than the maximum segment size before the start of the next marked portion of content. Two variant preprocessed streams in accordance with several embodiments of the invention are conceptually illustrated in FIG. 6.

The preprocesses creating variant streams may run as independent processes embedding by applying deterministic rules on identification of the locations to ensure to pick the same locations in all alternative variants. There may also be one process that only reads the YUV file once and outputs two separate files or outputs only frames that differ separately. These variations depend on the tradeoff of runtime vs integration complexity where the creation of a full stream or file for each variant is the slowest process with the lowest integration complexity.

This process may be applied on YUV information that is stored in individual files for each frame or in a common file for all frames or other formats, in particular those that are readily understood by existing encoders. The encoder (on the second pass if there was a separate first pass prior) is taking the marked YUV files (at least 2) and encoding them into different files of any codec and container format.

The content is encoded (414) into output streams using video compression techniques. In embodiments including two (or more) passes, the video compression portion of encoding of output streams occurs in the second (or last) pass. In embodiments having a single pass, the video compression of output streams may include the components of the first pass described above. In some embodiments, portions of the content that are not marked are encoded only one for all the streams rather than for each stream by utilizing information concerning the locations of the watermarks. This can increase complexity of the encoder in needing to recognize and skip marked portions, but reduce the amount of encoding to be performed and storage space for the unmarked portions. In other embodiments, each preprocessed stream is processed including common portions that are not marked. This can reduce complexity of the encoder, as the encoder would not need to recognize and skip marked portions.

In several embodiments of the invention, the process includes creating multiple output streams at the same resolution but at different bitrates. In several embodiments of the invention, an encoding server has multiple processors and the encoder controllers may each run on different processors or otherwise distributed across the processors. Output streams may be encoded at a constant bit rate (CBR) or variable bit rate (VBR).

Figure 7:
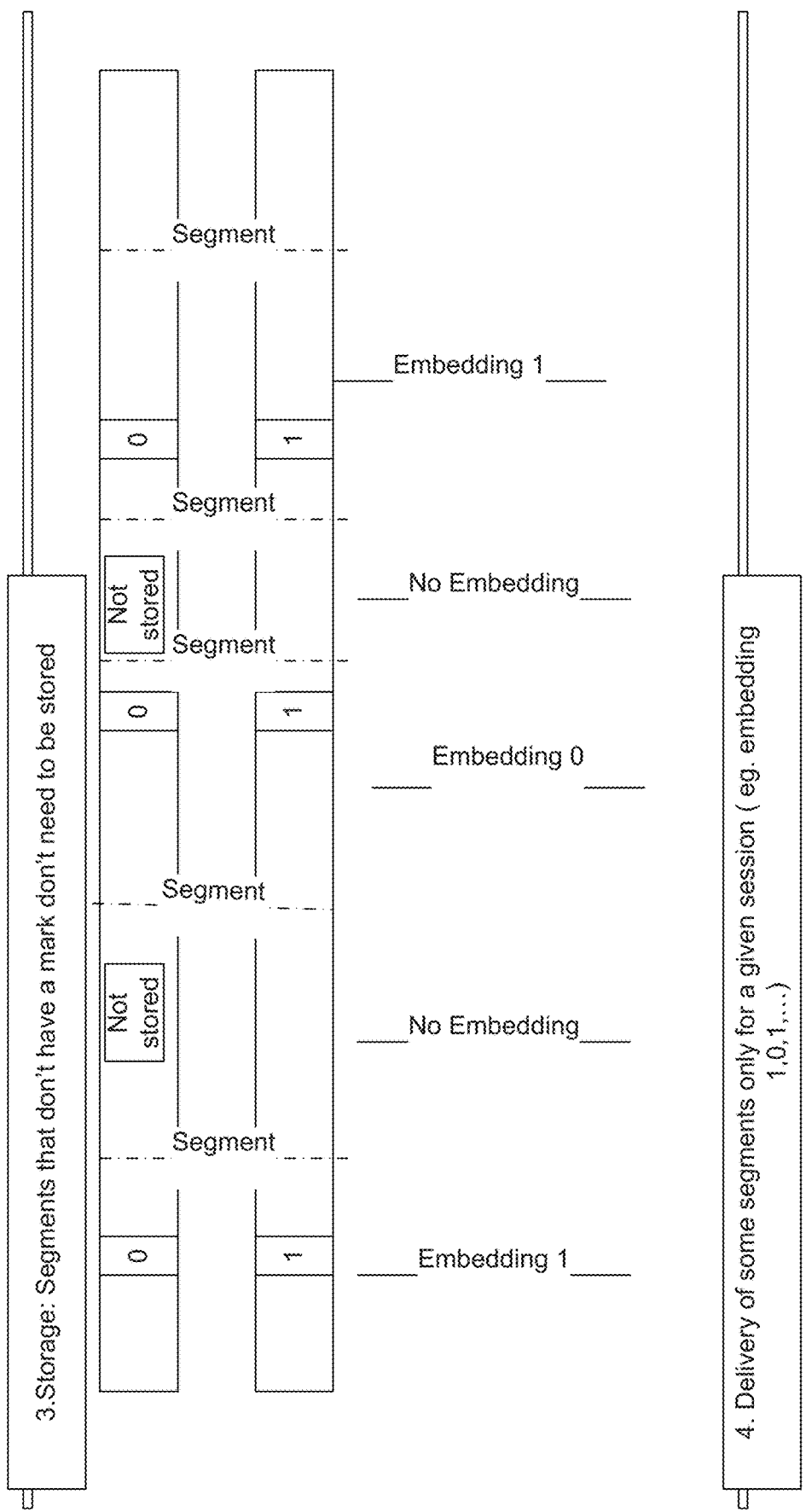
FIG. 7 conceptually illustrates examples of content during various stages of encoding in accordance with embodiments of the invention.

The process includes partitioning (416) the encoded streams by determining segment boundaries. In many embodiments of the invention, a predetermined maximum segment size limits the size of all segments that are generated. Similarly, the segmenter does not need to be changed to accommodate the embedding locations but can create segments according to rules as applied without watermarking. This is important because the segmentation may be applied in many different modules and may be applied differently for different ABR formats (e.g. different segment size for HLS and DASH). Segmented encoded output streams in accordance with several embodiments of the invention are conceptually illustrated in FIG. 7.

The process includes generating (418) a representation of encoded content marked with the watermark sequence. In several embodiments, this can include selecting segments from the variants of encoded streams where the markings of each segment represent a digit in the watermark sequence. The sequence of selected segments then is indicative of the watermark sequence. In some embodiments, this can include creating an asset playlist for providing a particular playback device with information it can use to retrieve content marked in a particular way. In other embodiments, this includes generating a playback file itself containing the segments of content. In many embodiments, storage of the encoded streams can be conserved by removing segments that are not marked differently. Storage and delivery of encoded segments in accordance with several embodiments of the invention is conceptually illustrated in FIG. 7.

The embedded watermark sequence may identify a subscriber or client device using at least one piece of information such as, but not limited to, a device identifier (ID), a user identifier (ID), MAC address, IP address, login name, session information, cookie, a random generated unique ID, or similar identifier. The embedded watermark sequence may utilize additional information, such as information identifying the particular piece of content (e.g., an asset identifier), time stamp, and/or operator identifier (ID).

In some embodiments, the embedded watermark sequence is generated from a user identifier, an asset identifier, and a session identifier. Additional detail on processes for payload encoding to generate an asset playlist is provided further below.

Although a specific process for encoding multiple media content streams utilizing shared statistics is discussed above with respect to FIG. 4, any of a variety of processes can be utilized to encode multiple media content streams for adaptive bitrate streaming in accordance with embodiments of the invention.

Creating Preprocessed Stream

As discussed further above, a preprocessed stream may be utilized for embedding watermarks in the content before encoding. A process for creating a preprocessed stream in accordance with several embodiments of the invention includes the following workflow:

As Input the preprocessor is receiving:

1. A file of a movie asset, typically in high quality format like e.g. YUV to process, including meta information about the size, resolution and frame rate.

2. Optionally an ID for the asset that is embedded in the content, in both tracks, to identify the origin of the asset as well as the asset file. Identification of the asset may be embedded with a different technology that can be read in a first extraction step allowing extraction of information that is helpful during extraction of a second mark that contains information about the individual session. The information in the first mark may relate to how the second mark has been embedded and marking locations.

3. The preprocessor may create two or more variant tracks or may be configured to create a single track only, in which case the information on which track to create is another input—e.g. 0 or 1. In this case, the preprocess is run once for each track.

4. Watermark configuration information such as bitrate of watermark.

5. Preprocessing parameters required to identify location and type of modifications, as well as primary marks and information used during the delivery step.

6. Optionally frame type file which could be provided from a first of the compression and can help to improve the selection of marking location by allowing better estimation of the segmentation locations, that can only happen on intra frame frame boundaries. Better estimation can make the mark more robust and allow for higher number of bits to be embedded.

Output

1. Variant tracks. A track is an encoding that contains data elements to be used to combine a payload. In a simple example a first track contains all markings representing 1 and another representing 0 to allow combination of arbitrary bitstrings combining the markings at different locations.

2. Information used during delivery that identifies the marking locations as time location in the stream or frame number.

Payload Encoding

Figure 5:
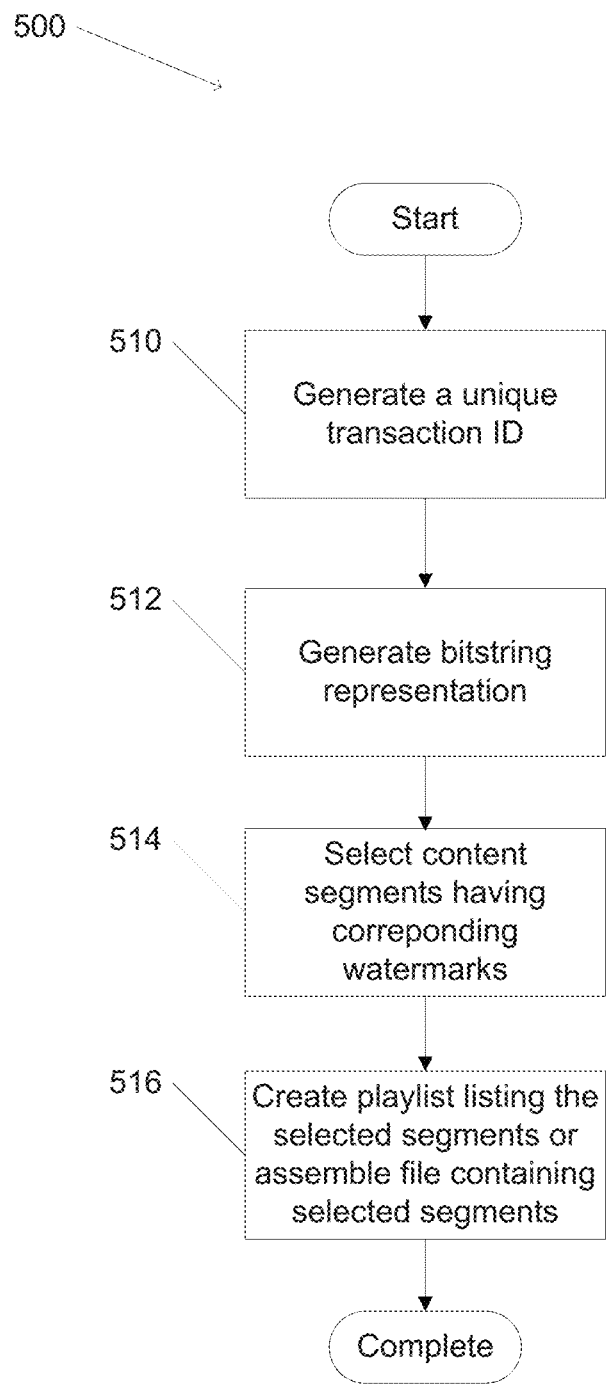
FIG. 5 is a flow chart illustrating a process for payload encoding in generating a playlist in accordance with embodiments of the invention.

A process for payload encoding to generate playback information of content marked by a watermark sequence for a particular playback device is illustrated in FIG. 5. The process 500 includes generating (510) a unique transaction ID. In many embodiments, the transaction ID is generated from a subscriber ID, an asset ID, and session information. In further embodiments, additional information such as, but not limited to, a time stamp and/or operator ID, are also utilized in generating the transaction ID. An operator ID may be a unique identifier or other information that is common to all content assets distributed by the operator. In some embodiments, the transaction ID may be incremented for additional records.

The process includes generating (512) a bitstring representing the transaction ID, where the bitstring may be derived in different versions that vary with different encodings in the content over time that increase security and robustness. Some of these may include negating payload, randomization payload, encrypting the payload, combining neighboring bits with XOR to bind them together, including several bits in a segment to allow bit chains against collision, and/or negating the bit sequence for some payload numbers.

In some embodiments, the encoding and variation may be the same for several content files and the encoding of each repetition is embedded with the repetition or known as meta information about the asset during extraction. The configuration may also be identified and embedded as a mark in the content. A primary mark, being the same for all copies of this asset, may be used for that purpose.

Segments of content are selected (514) that correspond to the bits represented in the bitstring. Segments are chosen based on the number of bits they encode. For example, in some embodiments this may include a choice between segments encoding 0 and 1, but in other embodiments it may also consider segments that do not encode information or that encode several bits (e.g., for 2 bits, there can be 4 segments alternatives for each segment, with patterns of 00, 01, 10, 11). In many embodiments, segments are selected based on the binary encoding (how the segments are watermarked) using the watermark sequence of the generated bitstring, and location information of modifications and segmentation information (start and end point of segments) derived from (e.g., .m3u8 playlist, DASH .mpd).

A marked content file, or a playlist containing information on how to retrieve the marked content file, is generated (4516) by determining a sequence of marked segments corresponding to the segments that encode the desired bitstring. This can be in any of a variety of formats, for example:

.m3u8—used for Apple HLS,

.mpd—manifest used for MPEG DASH streaming format, and others.

Segments concatenated to a video file in format including ISOBMFF (iso based media file format/mp4) or MPEG transport stream, including bits in a token in an access URL to be available for selection during retrieval of segment, or a virtual file or virtual playlist.

In some embodiments, the segments are prepared individually rather than across the entire playlist. For example, if segments are not addressed individually but have the same access link that varies in the identifier of a segment or video location only. This may be the case for a templated manifest (as they can be used in MPEG DASH) or for security reasons (where the difference between segments should not be revealed in the playlist).

To enable the process to be executed later, a session may be available that allows execution of the above process on a per segment basis during segment request—on the fly. In this case the playlist is a segment selection list that contains the segment decisions and is associated with a download or playback session with a token in the request, cookies or other means. The segment selection list is the interpreted during the delivery of the content. Though the process may be executed only once per asset and stored in a token with each access request. These are 510, 512, and 514 where the token can represent the unique ID, be converted to a bitstring and converted to segment selection to accelerate and simplify the selection of the segment.

The conversions may be executed on integrated libraries or modules in other applications or on independent servers that communicate with a remote API to allow e.g. playlist manipulation (i.e. transformation) or taken evaluation and re-routing.

Upon commencement of playback by a playback device, the file can be transferred to the playback device. In some embodiments in which a playlist is used, the playlist is initially provided to the playback device. The playback device can then use the information in the playlist to request portions of the content.

Although a process for payload encoding is described above with respect to an embodiment of the invention illustrated in FIG. 5, any of a variety of processed may be utilized in accordance with embodiments of the invention.

Additional Optimizations

Reduced Overhead Storage

Create additional tracks without a mark to correct for errors or segments that should not be used, e.g., assume segment boundaries and if they are not maintained, the segments are not used accordingly and replaced with unmarked segments from the neutral (e.g. 3rd) track.

Integration Points

The preprocessor logic may be integrated in a separate module, process or machine that operates on a file, or part thereof and provides the results to the video encoder machine, module or process. This provides a high level of independence between the components. Alternatively the preprocessor may also be integrated in the encoder using an Application Programming Interface (API) between them that is passing frame data along with information about the frame from the encoder to the preprocessor to be modified. In either case, the encoder may run for several output streams—in parallel or consecutively. In the case of API this could mean that each preprocressor is configured to produce only one watermarking alternative variant stream.

Embedding Alternative

While the above description ensures spacing of the locations in minimum intervals greater than maximum segment length, an alternative approach is embedding the locations in possibly smaller distances which may include continues embedding over time. The segmentation and embedding in this case may include several marks in one single segment. The number of marks per segment can be determined during extraction when the locations and segmentation of the content are used during extraction to determine which segments have been encoded for the stream that is being extracted. This does require the knowledge of the embedding location and segmentation during extraction either explicitly or implicitly derived from static values or by guessing.

Security Additions

Various elements to secure the execution of the playlist are outlined in U.S. Patent Publication No. 2013/0054972 to Thorwirth, the disclosure of which is hereby incorporated by reference in its entirety. The Thorwirth publication describes ways to secure token based access and combine access tokens with head end control of who and for how long the token can be accessed. As well as cryptographic means including hash and encryption to secure the token.

Live Workflow

When the system is applied to a live workflow (e.g., an event in real time), the execution speed is critical and the following optimizations, while not limited to live content are particularly useful in that case:

The preprocessing of the content may be performed in a single pass, not using or creating first pass information. Embedding locations in time, in this case are chosen within a segment by using signaling for IDR frames that, in particular when combined with segment duration and fixed segment duration, indicate a new segment. Also fixed embedding locations that have the same temporal distance as the fixed segment duration enable marking that is isolated between all segments and can therefore be addressed individually when choosing individual segments. Embedding a mark in every segment has the additional advantage that the information about the segments that contain a mark is static if every segment contains a mark. The segment selection, in this case, only needs to apply the segment selection without considering unmarked segments and requiring an information stream from the preprocessor.

To allow for faster processing, the preprocessor may be integrated in the encoder in this case, using an interface that e.g. exchanges baseband frames. As in the non-live/video-on-demand case, the encoder may run in two (or more) independent instances that each create a different variant of the segments by using a preprocessor that is configured differently but without having to be otherwise adjusted to the process.

Collusion Prevention

Instead of selecting or re-routing segments, individual segments may also be created for individual sessions, e.g. including the transaction or client number in a single frame or segment. In an attack that would mix segments from differently marked streams to obfuscate the bitstring, this single segment would reveal the identity. While this can be slower to prepare a unique segment, this would not have to be done often and can be made anticipating the request (e.g. when movie starts for segment 5 minutes in) and allow time for preparation.

Between these alternatives of embedding all or many bits of information in a single segment and the approach to embed a single bit per segment, other encoding variations allow improved ability for reading payload from one or all contributing colliding streams by embedding several bits in a segment. E.g., two bits can be embedded by either allowing 4 alternative variants with 4 alternative segments in the same location for some segment or by creating a single alternative segment in 4 different segment locations, each of these alternatives representing a combination of the two bit values while the other has no marking. When used three of the four locations are used without marking while one of alternative is chosen to embed the two bits it contains. This allows a possibility of only having a maximum of one alternative segment and still embed several bits together.

This can be used to limit the amount of segments that are used that contain a modification and allows embedding of several bits from one payload to facilitate the decoding and assigning related bits to one of the payload bit strings.

Applications

The systems and techniques described above can be used in a virtually limitless range of applications. The following are provided as a series of examples of applications in which systems and processes in accordance with embodiments of the invention can be useful.

Tracking Unauthorized Distribution of Secret or Copyrighted Information

A problem that faces many industries is the unauthorized distribution of information. Systems and processes in accordance with embodiments of the present invention can be used to embed marks in media information at the time of reception or display of the media. Each distributed copy can be uniquely marked with information such as a recipient identification number and a time stamp and, if the copy is publicly available or in the possession of an entity or individual that is not authorized to possess the information, the information can be uncovered and the entity or person that is the recipient of the media and the likely source of the unauthorized distribution can be identified.

In many instances, the secret or copyrighted information is passed between several different entities and/or individuals during production and authorized distribution. In several embodiments, the point from which the information was distributed without authorization can be ascertained by embedding a mark associated with the last recipient of the information prior to delivery or display. The entity or individual that is responsible for the unauthorized distribution can then be identified based upon the last mark added to the media.

A common instance, in which copyrighted information is communicated, is the distribution of copyrighted media via a network to a media player. In many embodiments, the player is a consumer electronics device such as a set top box or a personal computer. The copyrighted media is typically distributed to the player in a compressed and encrypted form. A mark can be embedded in the media in accordance with embodiments of the invention. The mark can contain information relating to the owner of the player and information identifying the time of transmission or playback. If the recipient of the information is known, the information to be embedded can be generated by the server (or head end) providing the media. The embedded information can also be stored by the server in a database that contains additional information about the transaction, such as the user's billing information and details about the receiving device. In other embodiments, the player maintains information such as player identification number and time, which is embedded as a mark during storage and/or playback.

Another instance in which unauthorized distribution is a common problem is in the production of media. During production, content is particularly vulnerable to unauthorized distribution that can cause considerable damage to the producer of the media. In many embodiments, marks are embedded in the media during various stages of production that identify the recipient of the media and the time of the receipt of the media. If the copy is made publicly available, the mark can be uncovered and the responsible person or entity can be identified.

In many embodiments of the invention, a perceptual model is created for the distributed media and stored or distributed with the media. The perceptual model can then be used as marks are embedded in the media. In other embodiments, a perceptual model is created every time a mark is embedded in the media.

Proof of Ownership

Once media is subject to public distribution, proving ownership of copyright in the media can be problematic. In many embodiments, marks are embedded in the media to prove ownership of the content. In a number of embodiments, the mark includes ownership information or identification for copyrighted content. This mark can be automatically read and its presence or absence can be evaluated to restrict or allow distribution or to verify that a source distributing the media is a legitimate distributor of the media. It can also be used, so that entities or individuals interested in obtaining rights with respect to the content can identify the owner of the content by uncovering the embedded mark. Another use for a mark identifying the owner is to automatically identify content in publicly available database, e.g., accessible through the internet for content owned by a specific owner or group of owners to prevent further distribution. Finally this mark can be used to prove ownership in case of a dispute.

Storing Robust Meta-Information

During long term storage and archival, information stored with media can be lost either because it is deleted accidentally or because it cannot be read. Many embodiments of the invention are configured to store information concerning media using marks. Storing information using marks can enable the information to be retrieved after format change and does not require additional storage space.

Copy Control

In many embodiments, a strong mark that is machine readable can be embedded into media. The mark can then be used by a player to control playback and/or recording of the media. The player can uncover the mark and ascertain the authorizations required to play the media. If the player has the appropriate authorizations, then the player can play the media or refuse playback otherwise.

Broadcast Monitoring

Machine readable marks in accordance with embodiments of the present invention can also be embedded in media broadcast by a television or radio station. The machine readable marks can then be used by receiver devices to automatically record the content that was broadcast and to track the frequency and time of broadcast. The mark embedded in the media can be distinct for each work and broadcast.

Secret Communication

As mentioned above, marks can be used to transmit secret information using media. While the transmission of the media can be observed the fact that the media contain an additional mark is not obvious and can be used to transmit information without allowing others to observe that information is transmitted other than the media content.

Identification of Publicly Displayed Media

Media that are publicly displayed are frequently the subject of rerecording. In many embodiments, a mark is embedded in publicly displayed media that identifies the time and/or place of public display. Should the media be rerecorded during the public display, then the mark is embedded in the unauthorized rerecording and uncovering this information can be helpful in preventing future rerecording of publicly displayed media at the venue in which the rerecording was made.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed is:

1. A method for preprocessing multimedia content into streams with watermark information, the method comprising:

receiving a source content media stream;

generating at least two variant preprocessed streams for each received source content media stream, where each variant preprocessed stream includes different watermark information in the same locations as the other variant preprocessed streams and where marked locations, having watermark information, are spaced apart at least a distance equal to a predetermined maximum segment size;

generating a set of embed location information describing marked locations in the variant preprocessed streams;

generating at least one variant output stream from each variant preprocessed stream using video compression, while encoding portions that are not marked only once for all streams rather than for each stream by utilizing the set of embed location information;

partitioning each variant output stream into a set of segments, where each segment is no longer than the predetermined maximum segment size and is marked with watermark information in at most one location and some segments do not have a mark;

generating a set of segment boundary information describing the boundaries of segments within the variant output streams and the boundaries are the same between variant output streams; and generating a segment selection list using the set of embed location information and the set of segment boundary information, where the segment selection list includes only one variant segment for each segment according to a watermark sequence and the digits of the watermark sequence correspond to the watermark information applied to each variant preprocessed stream.

2. The process of claim 1, further comprising generating a playlist from the segment selection list, where the playlist includes information enabling a playback device to retrieve watermarked content.

3. The process of claim 1, further comprising generating a media file from the segment selection list, where the media file includes content segments marked in a manner corresponding to the watermark sequence of the segment selection list.

4. The process of claim 1, wherein generating at least one variant output stream from each variant preprocessed stream using video compression includes generating a set of alternative streams from each variant preprocessed stream, where the alternative streams in each set differ in bitrate and the available bitrates in each set is the same.

5. The process of claim 1, wherein generating at least one variant output stream from each variant preprocessed stream using video compression includes compressing segments that are not marked only once.

6. The process of claim 1, wherein the watermark sequence is a binary representation of the different ways that the selected segments are marked.

7. The process of claim 1, wherein the watermark sequence is generated from a transaction identifier associated with a purchase transaction.

8. The process of claim 7, wherein the watermark sequence is also generated using a subscriber identifier associated with a user.

* * * * *